(12) United States Patent
Wittmann

(10) Patent No.: US 11,584,270 B2
(45) Date of Patent: Feb. 21, 2023

(54) METHOD FOR MONITORING A STATE OF WEAR OF A DAMPING DEVICE

(71) Applicant: GRAMMER AG, Amberg (DE)

(72) Inventor: Hubert Wittmann, Amberg (DE)

(73) Assignee: GRAMMER AG, Ursensollen (DE)

( * ) Notice: Subject to any disclaimer, the term of this patent is extended or adjusted under 35 U.S.C. 154(b) by 313 days.

(21) Appl. No.: 16/899,818

(22) Filed: Jun. 12, 2020

(65) Prior Publication Data
US 2020/0391632 A1    Dec. 17, 2020

(30) Foreign Application Priority Data

Jun. 13, 2019 (DE) .......................... 102019116118.5

(51) Int. Cl.
*B60N 2/50* (2006.01)

(52) U.S. Cl.
CPC ........ *B60N 2/501* (2013.01); *B60G 2400/102* (2013.01); *B60G 2400/206* (2013.01); *B60G 2400/252* (2013.01); *B60G 2400/70* (2013.01)

(58) Field of Classification Search
CPC .............. B60N 2/501; B60G 2400/102; B60G 2400/206; B60G 2400/252; B60G 2400/70
USPC ...................................................... 248/550
See application file for complete search history.

(56) References Cited

U.S. PATENT DOCUMENTS

| 5,358,305 A | 10/1994 | Kaneko et al. | |
| 2004/0020731 A1* | 2/2004 | Hillreiner | B62J 1/06 188/322.19 |
| 2006/0181132 A1* | 8/2006 | Folkert | B60N 2/206 297/378.1 |
| 2009/0008977 A1* | 1/2009 | Lorey | B60N 2/502 297/344.19 |
| 2018/0363724 A1* | 12/2018 | McCullough | B60N 2/501 |
| 2020/0156518 A1* | 5/2020 | Svitak | B60N 2/505 |

FOREIGN PATENT DOCUMENTS

| CN | 208765944 | 4/2019 |
| DE | 102005047801 | 4/2007 |
| DE | 102009051989 | 5/2011 |
| FR | 2925680 | 6/2006 |
| WO | WO 2019/105532 | 6/2019 |

OTHER PUBLICATIONS

Official Action for German Patent Application No. 102019116118.5, dated Feb. 19, 2020, 2 pages.
Official Action with Machine Translation for France Patent Application No. FR2006174, dated Dec. 14, 2022, 11 pages.

* cited by examiner

*Primary Examiner* — Mahmoud S Ismail
(74) *Attorney, Agent, or Firm* — Sheridan Ross P.C.

(57) ABSTRACT

The invention relates to a method for monitoring a state of wear of a damping device within a system. The system includes a vehicle seat having a first portion which is movably mounted in at least one direction with respect to a second portion, a damping device for damping oscillations is arranged between the first portion and the second portion, and a first sensor that determines an instantaneous relative position of the first portion with respect to the second portion. A displacement function in relation to the relative position of the first portion with respect to the second portion is defined as a function of time, and a current value of the displacement function is determined at selected intervals and summed. The sum is compared with a predetermined first limit.

6 Claims, 5 Drawing Sheets

METHOD FOR MONITORING A STATE OF WEAR OF A DAMPING DEVICE

CROSS REFERENCE TO RELATED APPLICATION

This application claims the benefit of German Patent Application No. 10 2019 116 118.5 filed Jun. 13, 2019, the entire disclosure of which is incorporated herein by reference in its entirety.

FIELD

The invention relates to a method for monitoring a state of wear of a damping device within a system.

BACKGROUND

Vehicle seats generally have portions which are mounted so as to oscillate relative to one another. For example, a vertical oscillation arrangement is arranged, according to which a first portion designed as an upper portion of the vehicle seat is oscillatory mounted by means of a scissor frame so as to oscillate with respect to a second portion designed as a lower portion of the vehicle seat. A horizontal oscillation arrangement is also possible. However, the present invention is explained using a vertical oscillation arrangement.

In addition to the scissor frame, a spring, for example in the form of a pneumatic, hydraulic and/or mechanical spring, and/or a damping device, for example in the form of a hydraulic damper, is arranged between the first and the second portion, for example.

For example, a first part of the damping device is attached to the first portion of the vehicle seat and a second part of the damping device is attached to the second portion of the vehicle seat, wherein the first part and the second part of the damping device are movably arranged relative to one another. For example, the first part of the damping device in the form of a piston is arranged on the upper portion of the vehicle seat and the second part of the damping device in the form of a cylinder on the lower portion of the vehicle seat. A movement of the upper part with respect to the lower portion results in an up and down movement of the scissor frame. At the same time, the piston of the damping device is moved into and out of the cylinder of the damping device. The energy of this movement is converted into heat in the damping device.

However, the damping device in particular wears out over time, which is associated with a loss of damping performance. It is known from prior art to replace the damping device with a new damping device after a certain predetermined service life, but without taking into account the actual load of the damping device.

SUMMARY

The object of the present invention is therefore to develop a method which allows a quantitative statement about the actual wear of the damping device.

A method for monitoring a state of wear of a damping device within a system is proposed, the system comprising:
a vehicle seat having a first portion, which is mounted movably in at least one direction with respect to a second portion,
wherein the damping device is arranged for damping oscillations between the first portion and the second portion, further comprising a first sensor for determining an instantaneous relative position of the first portion with respect to the second portion in relation to a predetermined initial relative position, characterised by the following method steps:

(101) defining a displacement function in relation to the relative position of the first portion with respect to the second portion as a function of time, (102) determining a current value of the displacement function at a first point in time, (103) determining an amount of the current value of the displacement function, (104) repeating the steps (102) and (103) in each case after a certain time interval up to a predeterminable last point in time and thus determining the amounts at each point in time, (105) determining a sum of all the amounts, (106) comparing the sum with a predetermined first limit.

Thus, reference is made to the displacement actually fulfilled within the damping device. For example, the displacement actually fulfilled is the displacement which the piston completes with respect to the cylinder. To prevent positive and negative values of the displacement from cancelling each other out, the amount is formed as described above. A current value of the displacement function is determined at each relevant point in time and further processed as described. Finally, a comparison is made between the sum of the amounts and a predetermined first limit. For example, if this comparison indicates that the sum is equal to or greater than the predetermined first limit, a message may be issued (for example via a display or a fault code of the vehicle control unit) recommending that the damping device be replaced accordingly. If this comparison results, for example, in the sum being lower than the predetermined first limit, no message is issued.

It must be taken into account that the displacement must always be regarded as the relative position of the first portion with respect to the second portion. It is therefore irrelevant for carrying out the method according to the invention whether only the first portion or both portions are moving.

Preferably, the first sensor is configured to determine the vertical position of the first portion with respect to the second portion by means of a rotation angle sensor located at the central pivot point of the scissor frame or a sensor. Thus, a detection of the temporal change of the height position of the first portion with respect to the second portion is possible indirectly by determining the rotation angle or directly.

It goes without saying that a higher-level control device is preferably provided, which carries out the determination of the data, the comparison and/or the message.

The displacement function is preferably selected from a relative position, a velocity, a product of the relative position and the velocity and an acceleration in each case of the first portion with respect to the second portion.

The determination of wear can thus be based on various quantities, each of which is based on the displacement completed by the first portion with respect to the second portion, wherein the displacement completed is equivalent to an instantaneous relative position of the first portion with respect to the second portion compared with an initial relative position of the first portion with respect to the second portion. It is well known that the velocity is the first time derivative of displacement and acceleration is the second time derivative of displacement and simultaneously the first time derivative of velocity.

The energy which is converted into heat in the damping device results, as explained above, from the movement of the two parts of the damping device relative to one another. The energy W of a damping device such as a linearly movable shock absorber can be calculated as the product of the damping force F and the displacement s of the first part of the damping device with respect to the second part:

$$W=F \cdot s$$

The damping force F in turn is the product of the damping constant d (a constant predetermined by the construction of the damping device) and the velocity v of the first part of the damping device with respect to the second part:

$$F=d \cdot v$$

Thus, the energy W is the product of the damping constant d, the velocity v and the displacement s:

$$W=d \cdot v \cdot s$$

The energy, the velocity and the displacement are time-dependent.

The product of displacement and velocity thus simultaneously provides a measure of the energy that has been converted into heat in the damping device. This value is therefore a measure of the intensity of use of the damping device.

The method can be modified according to a preferred embodiment by providing a second sensor in the form of a temperature sensor, wherein the method comprises further steps:

(107) detecting a current temperature of the damping device, (108) comparing the current temperature of the damping device with a predetermined temperature limit, (109) If the comparison according to step (109) results in the temperature being higher than the predetermined temperature limit: determining a respective quotient of the predetermined first limit and a predetermined correction factor having a value greater than 1, and setting the determined quotient as the predetermined first limit for the comparison according to step (106).

The temperature is preferably measured as an instantaneous value in the middle of a daily operating time of the damping device. It is also preferable if a mean value of the temperature over all or a portion of the daily operating time is determined and compared in step (108) with the predetermined temperature limit.

The background is that, as described above, the kinetic energy of the movement of the vehicle seat is converted into heat in the damping device. As a result, the damping device heats up at least in part. In particular, a damping fluid heats up, which is generally oil. However, the heating has a negative effect on the service life of the plastic seals and the viscosity of the oil in the damper. It is therefore proposed to additionally attach a temperature sensor to the damping device. Thus, the influence of temperature can be taken into account in the wear calculation as a correction factor for faster ageing.

According to a preferred embodiment, the temperature limit is 60° C. and the predetermined correction factor is 1.5. If the temperature limit is now exceeded, a limit smaller by a factor of 1.5 than the predetermined first limit is set instead of the limits mentioned above. Thus, the damping device reaches the predetermined first limit after a shorter time, since the faster ageing due to the temperature influence is taken into account.

Advantageous embodiments can be found in the dependent claims.

BRIEF DESCRIPTION OF THE DRAWINGS

Advantages and expediencies can be found in the following description in conjunction with the drawings.

In the drawings:

FIG. 1b is a schematic representation of a scissor frame of the vehicle seat according to FIG. 1a;

FIG. 1a shows a system S and more precisely a vehicle seat 1 having a backrest RL, a seat portion ST and an armrest AL. A first portion 2 (upper portion) of the vehicle seat 1 is oscillatory mounted with respect to a second portion 3 (lower portion) of the vehicle seat 1 by means of a vertical oscillation arrangement in the form of a scissor frame 6.

FIG. 1b schematically shows the system based on this scissor frame 6, on which a pneumatic spring 7 and a damping device 4 in the form of a hydraulic damper are arranged in each case between the first 2 and the second portion 3. In this case, a first part 41 of the damping device 4 in the form of a piston is attached to the first part 2 of the vehicle seat 1 and a second part 42 of the damping device 4 in the form of a cylinder is attached to the second part 3 of the vehicle seat 1, wherein the first part 41 and the second part 42 of the damping device 4 are arranged so as to be movable relative to one another.

Figure 1A:
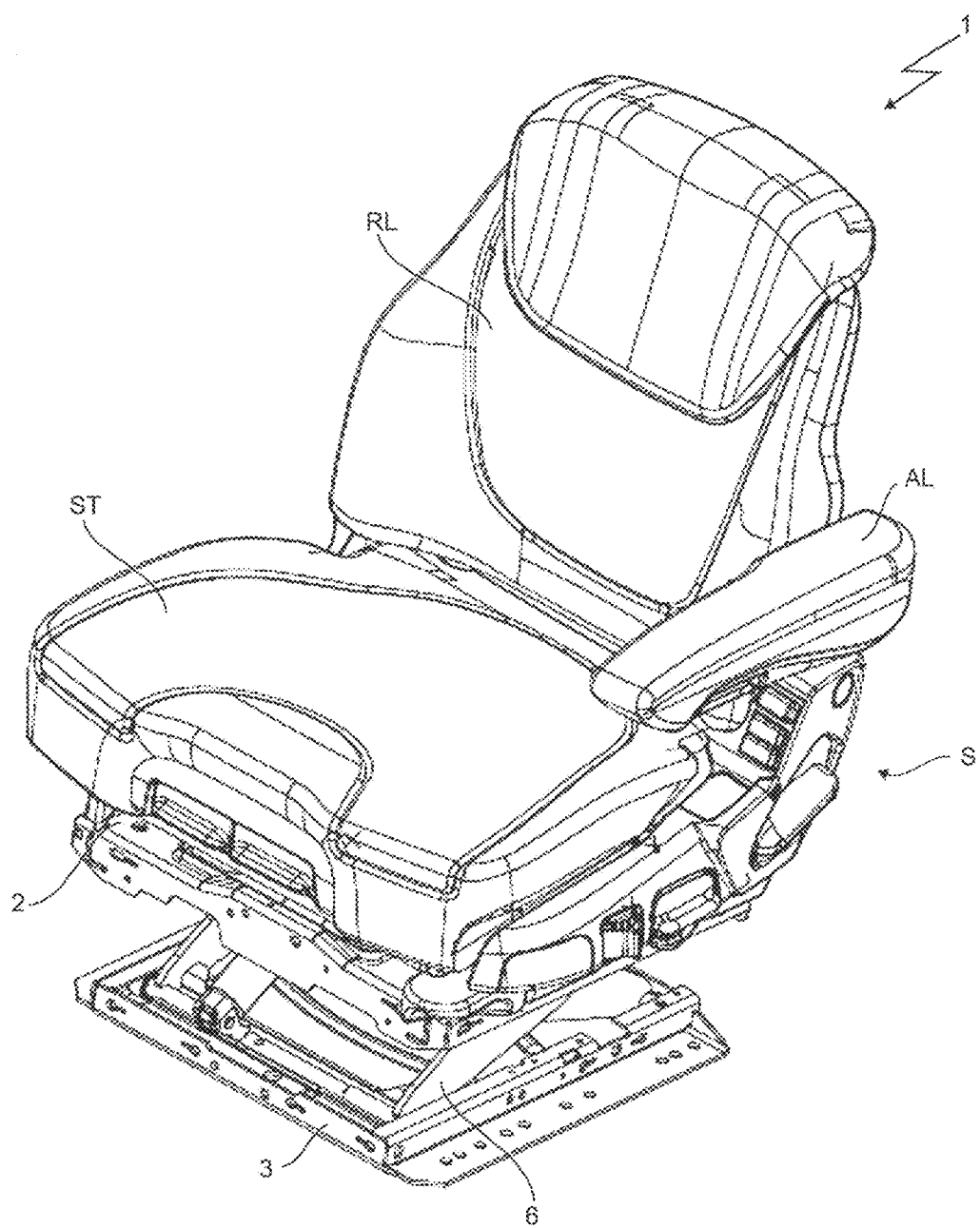
FIG. 1a is a perspective view of a vehicle seat.

In the present case, the system S thus comprises the vehicle seat 1 having a first portion 2, which is movably mounted with respect to a second portion 3 in at least one direction 1z, wherein the damping device 4 is arranged for damping oscillations between the first portion 2 and the second portion 3, and further a first sensor 5 for determining an instantaneous relative position (see also FIG. 2b) of the first portion 2 with respect to the second portion 3 in relation to a predetermined initial relative position x0.

In the present case, the first sensor 5 is configured by a rotation angle sensor arranged at the central pivot point 60 of the scissor frame 6.

Figure 1B:
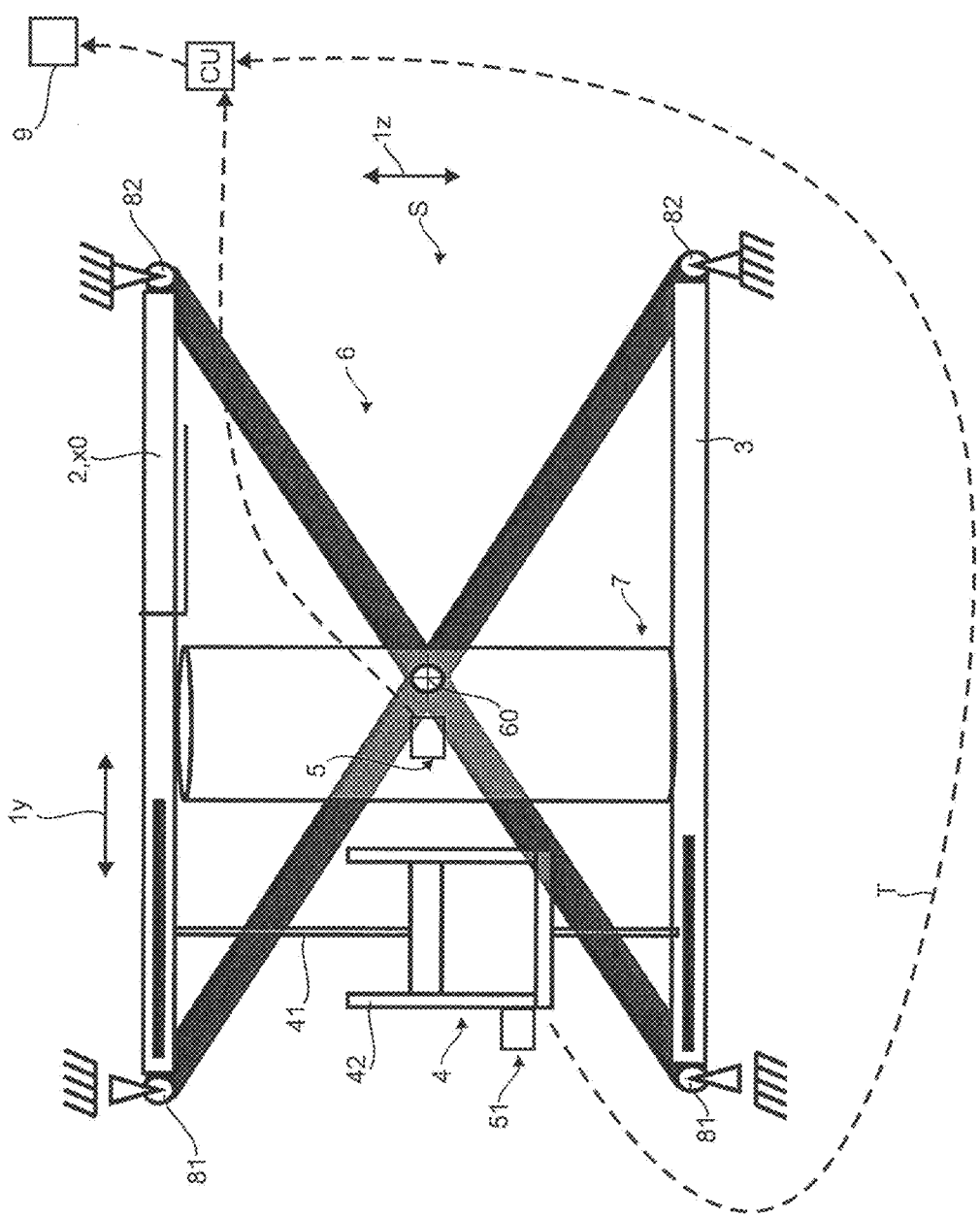

In the present case, the initial relative position x0 is defined as the distance in direction 1z between the first portion 2 and the second portion 3 in an undeflected position of the scissor frame, which may be defined, for example, in that the guide rollers of the floating bearings 81 (see FIG. 1b, arranged in each case on the left of the first portion 2 and the second portion 3) being in a central position in relation to a width direction 1y. In addition, locating bearings 82 are arranged in each case on the right of the first portion 2 and the second portion 3.

In the present case, a higher-level control unit CU is provided, which carries out the determination of the data, the comparison and a message. It receives the data from the first 5 and also from the second sensor 51 and, if necessary, forwards a signal to a display device 9, whereupon the display device 9 transmits a visual and/or acoustic message to the driver.

The second sensor 51 is arranged in the present case on the outside of the damping device 4 and is configured in the form of a temperature sensor.

Figure 2A:
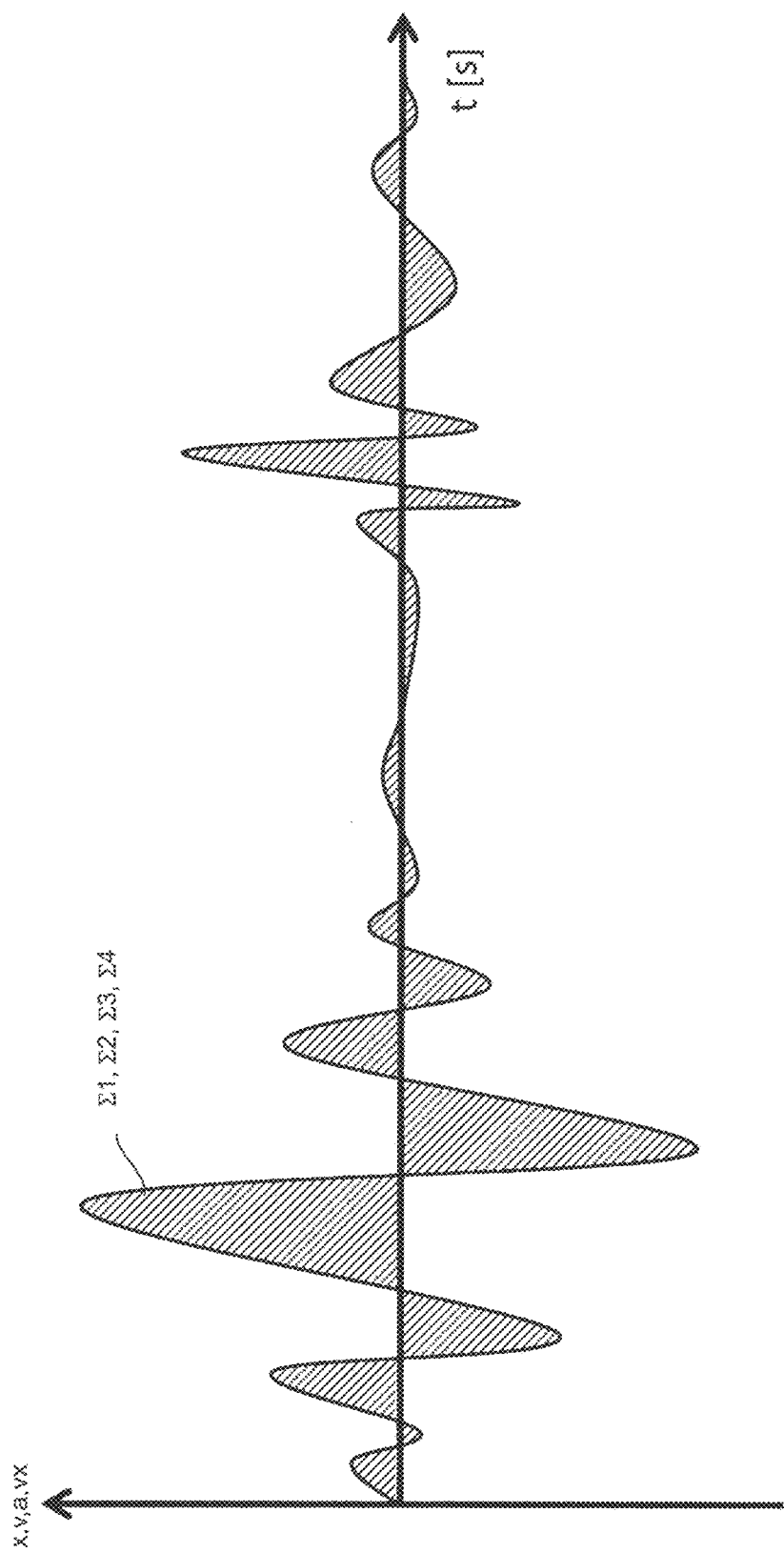
FIG. 2a is a graph showing an exemplary course of the displacement function.
Figure 2B:
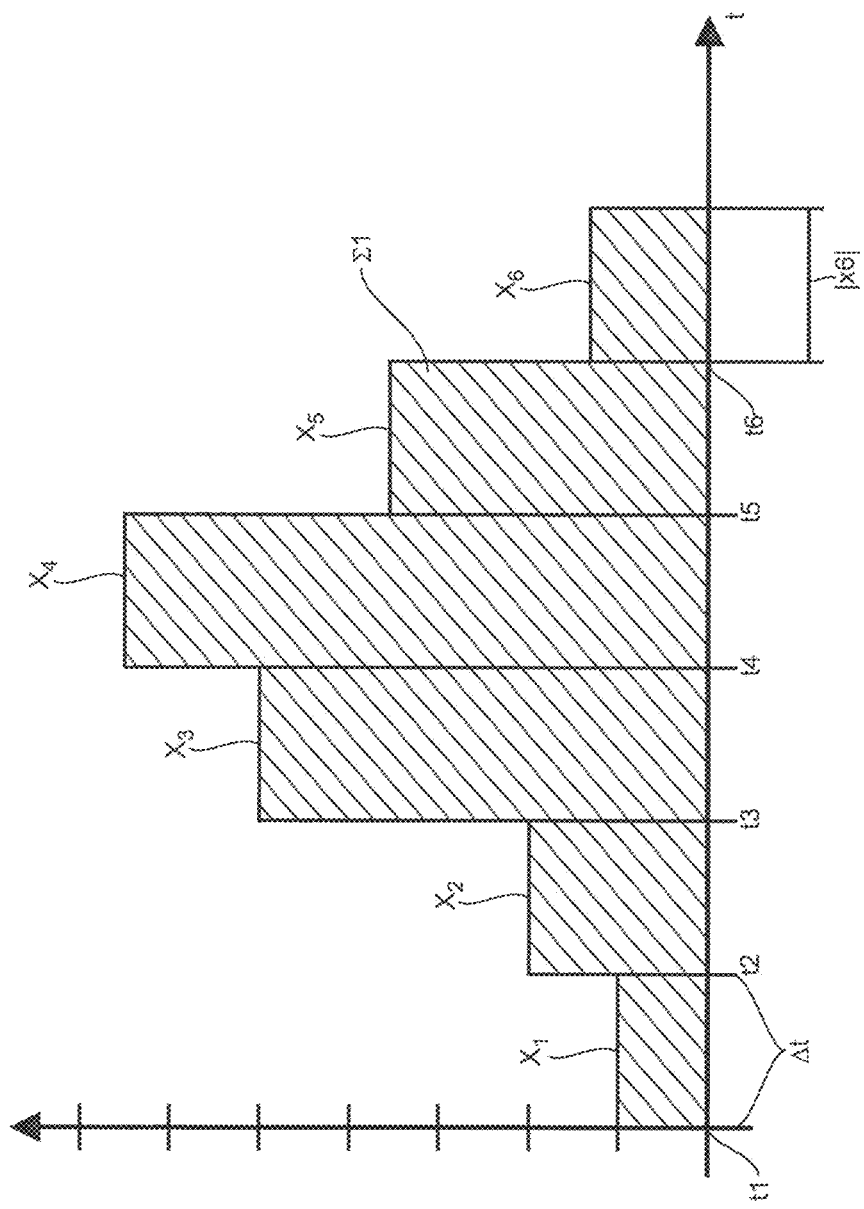
FIG. 2b is a section of another graph showing an exemplary course of the displacement function.

FIGS. 2a and 2b show by way of example the course of a displacement function x, v, xv, a of the first portion 2 with respect to the second portion 3 over time t. Since the graph shown could represent all the possible displacement functions x, v, xv, a, all the displacement functions x, v, xv, a are marked. Relevant for the present method 100 is the determination of the hatched area, i.e. the integral of the displacement function x, v, xv, a over the time t. This integral corresponds to one of the sums Σ1, Σ2, Σ3 or Σ4.

FIG. 2b again illustrates the basic idea of integral calculus using the example of arbitrarily selected points in time t1 to t6, according to which the hatched area between the function graph and the t-axis can be divided into a large number of narrow rectangles, as is well known, wherein the bases of all the rectangles lie on the t-axis and the heights of the rectangles are given by the current values x1 to x6 at the respective points t1 to t6. In this case, a base has a value of the predetermined time integral Δt. While the values x1 to x5 are positive, the value x6 is negative, so that the amount |x6|, which is included in the calculation of the sum Σ1, is also illustrated here.

Figure 3:
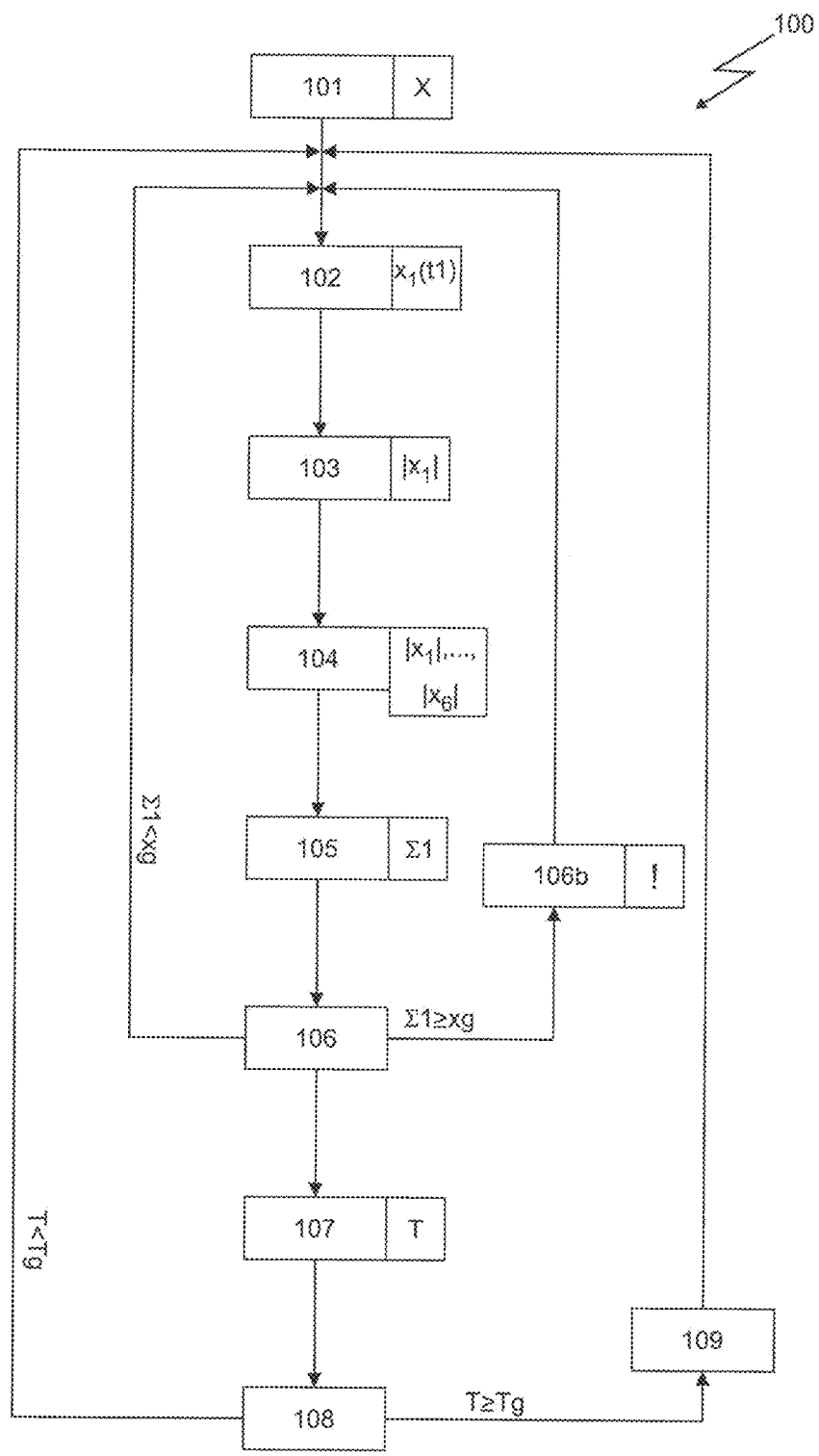
FIG. 3 is a flowchart showing a preferred sequence of the method.

FIG. 3 shows a preferred sequence of the method 100 for monitoring a state of wear of the damping device 4 within the system S. The method 100 is described in the present case on the basis of the section of the displacement function x (see also FIG. 2b), which describes the relative position x1-x6 of the first portion 2 with respect to the second portion 3 as a function of time t in the time period from t1 to t6. The method 100 has the following method steps:

(101) defining a displacement function x in relation to the relative position x of the first portion 2 with respect to the second portion 3 as a function of time t, (102) determining a current value x1 of the displacement function x at a first point in time t1, (103) determining an amount |x1| of the current value x1 of the displacement function x, (104) repeating the steps (102) and (103) in each case after a certain time interval Δt up to a predeterminable last point in time t6 and thus determining the amounts (|x1|, |x2|, . . . , |x6|) at each point in time (t1, . . . , t6), (105) determining a sum Σ1 of all the amounts (|x1|, |x2|, . . . , |x6|), (106) comparing the sum Σ1 with a predetermined first limit xg.

If in step (106) it is noticed that the sum Σ1 is equal to or greater than a predetermined first limit xg, a message is sent to the driver according to step (106b), which may result in replacement of the damping device 4.

If this is not the case, the method 100 in the present example continues at step (102).

Alternatively, the method 100 may comprise further steps after step (106):

(107) detecting a current temperature T of the damping device 4, (108) comparing the current temperature T of the damping device 4 with a predetermined temperature limit Tg, (109) if the comparison according to step (109) results in the temperature T being higher than the predetermined temperature limit Tg: determining a respective quotient from the predetermined first limit xg and a predetermined correction factor having a value greater than 1, and setting the determined quotient as the predetermined first limit for the comparison according to step (106).

All the features disclosed in the application documents are claimed as being essential to the invention, either individually or in combination, provided that they are novel over prior art.

LIST OF REFERENCE SIGNS 1 vehicle seat
1y width direction
1z vertical direction
2, 3 portion
4 damping device
5, 51 sensor
6 scissor frame
7 spring
9 display device
41, 42 part
81 floating bearing
82 locating bearing
100, 200, 300, 400 method
101, 102, . . . , 109 method step
xg limit
CU control device
S system
t1, . . . , t6 point in time
x0 initial relative position
x1, x2, . . . , x6 relative position
AL armrest
RL backrest
ST seat portion
|x1|, |x2|, . . . , |x6| amount
Σ1, Σ2, Σ3, Σ4 sum

What is claimed is:

1. A method for monitoring a state of wear of a damping device within a system, the system comprising:
   a vehicle seat having a first portion, which is mounted movably in at least one direction relative to a second portion;
   a damping device, wherein the damping device is arranged between the first portion and the second portions;
   a first sensor, wherein the first sensor determines an instantaneous position of the first portion relative to the second portion,
   wherein the method includes:
   using the first sensor, obtaining a position value for the position of the first portion with respect to the second portion at different points in time;
   determining a sum of all of the obtained position values;
   comparing the sum with a predetermined first limit; and
   in response to determining that the sum is greater than the predetermined first limit, outputting a message recommending replacement of the damping device.

2. The method according to claim 1, wherein a displacement function is selected from a relative position, a velocity, a product of the relative position and the velocity and an acceleration in each case of the first portion relative to the second portion.

3. The method according to claim 1, wherein a second sensor in the form of a temperature sensor is provided, wherein the method further comprises:
   detecting a current temperature of the damping device,
   comparing the current temperature of the damping device with a predetermined temperature limit,
   if the comparison results in the temperature being higher than the predetermined temperature limit:
   determining a respective quotient of the predetermined first limit and a predetermined correction factor with a value greater than 1, and setting the determined quotient as the predetermined first limit for the comparison.

4. The method according to claim 1, wherein the message is output as a visual message via a display.

5. The method according to claim 1, wherein the message is output as an acoustic message.

6. The method according to claim 1, wherein the message is output as a fault code provided to a vehicle control unit.

* * * * *